United States Patent
Koizumi et al.

(10) Patent No.: US 11,971,332 B2
(45) Date of Patent: Apr. 30, 2024

(54) FEATURE EXTRACTION APPARATUS, ANOMALY SCORE ESTIMATION APPARATUS, METHODS THEREFOR, AND PROGRAM

(71) Applicant: NIPPON TELEGRAPH AND TELEPHONE CORPORATION, Tokyo (JP)

(72) Inventors: Yuma Koizumi, Tokyo (JP); Shoichiro Saito, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 310 days.

(21) Appl. No.: 17/630,141

(22) PCT Filed: Jul. 30, 2019

(86) PCT No.: PCT/JP2019/029776
§ 371 (c)(1),
(2) Date: Jan. 25, 2022

(87) PCT Pub. No.: WO2021/019671
PCT Pub. Date: Feb. 4, 2021

(65) Prior Publication Data
US 2022/0260459 A1    Aug. 18, 2022

(51) Int. Cl.
*G01M 99/00* (2011.01)
(52) U.S. Cl.
CPC ................... *G01M 99/005* (2013.01)
(58) Field of Classification Search
CPC .................................................. G01M 99/005
(Continued)

(56) References Cited

U.S. PATENT DOCUMENTS

2010/0260353 A1* 10/2010 Ozawa ............... H04R 3/04
                                                     381/94.3
2014/0219478 A1*  8/2014 Takahashi ......... H04S 1/007
                                                     381/119

FOREIGN PATENT DOCUMENTS

JP    S58-100734 A    6/1983
JP    H9-166483 A     6/1997
(Continued)

OTHER PUBLICATIONS

Koizumi et al. (2019) "Unsupervised Detection of Anomalous Sound based on Deep Learning and the Neyman-Pearson Lemma," IEEE/ACM Transactions on Audio, Speech, and Language Processing, vol. 27-1, pp. 212-224.

(Continued)

*Primary Examiner* — Sean H Nguyen

(57) ABSTRACT

By appropriately registering a sound with an arbitrary length to be registered, erroneous determination is suppressed. A normal sound registration apparatus 1 extracts a feature amount with a fixed-length from a time-series acoustic signal with a variable arbitrary length. A frequency conversion unit 12 acquires a time-series frequency signal obtained by frequency-converting the time-series acoustic signal. A feature extraction unit 14 extracts a feature amount from the time-series acoustic signal. The feature extraction unit 14 is optimized to extract, from the time-series acoustic signal including at least a known normal sound and an unknown normal sound, a feature amount which reflects a feature of the unknown normal sound, and to extract, from the time-series acoustic signal including at least an anomalous sound and a normal sound, a feature amount which reflects a feature of the anomalous sound.

14 Claims, 7 Drawing Sheets

(58) Field of Classification Search
USPC .......................................................... 381/56
See application file for complete search history.

(56) References Cited

FOREIGN PATENT DOCUMENTS

JP         11-118593 A    4/1999
JP       2018-022014 A    2/2018

OTHER PUBLICATIONS

Koizumi et al. (2019) "SNIPER: Few-shot Learning for Anomaly Detection to Minimize False-Negative Rate with Ensured True-Positive Rate," in Proceedings of International Conference on Acoustics, Speech and Signal Processing (ICASSP 2019).

* cited by examiner

FEATURE EXTRACTION APPARATUS, ANOMALY SCORE ESTIMATION APPARATUS, METHODS THEREFOR, AND PROGRAM

CROSS-REFERENCE TO RELATED APPLICATIONS

This application is a U.S. National Stage Application filed under 35 U.S.C. § 371 claiming priority to International Patent Application No. PCT/JP2019/029776, filed on 30 Jul. 2019, the disclosure of which is hereby incorporated herein by reference in its entirety.

TECHNICAL FIELD

The present invention relates to an anomaly detection technique for determining whether a monitored object is in a normal state or an anomalous state.

BACKGROUND ART

If commercial equipment such as large-scale manufacturing machines and molding machines installed in factories or the like simply stops operating due to a failure, it will cause a great hindrance to business. Therefore, it is necessary to monitor its operating status on a daily basis and take immediate action as soon as an anomaly occurs. As a solution, there is a method in which a manager of commercial equipment regularly dispatches maintenance personnel to the site to check for wear of parts and the like. But it is difficult to do this for all commercial equipment and factories due to the high labor costs, travel costs and labor involved. As a solution to this, there is a method of installing a microphone inside commercial equipment and monitoring its operating sound on a daily basis. This method analyzes the operating sound picked up by the microphone, detects when a sound which seems to be anomalous (hereinafter referred to as "anomalous sound") occurs, and raises an alert to solve the above problem. In this way, the technique of using sound to determine whether the monitored object is in a normal state or an anomalous state is called anomalous sound detection.

Anomalous sound detection is a problem of determining whether the observed signal $X=\{x_t \in \mathbb{R}^F\}_{t=1}^T$ is normal data or anomalous data. Here, $x_t$ is the input of the t-th time frame, and its actual state may be the amplitude spectrum of sound, or may be the result of extracting some feature amount.

As an implementation method of anomalous sound detection, there is a method of determining the observed signal X to be anomalous if the value of the function $A_{\theta_A}(x)$ with a parameter $\theta_A$, which obtains an index indicating how anomalous the input x is (hereinafter referred to as "anomaly score"), exceeds the threshold value $\varphi$ even in one frame. This is represented by the expression (1).

[Math. 1]

$$\text{Identification result}=H(A_{\theta_A}(x_t)-\varphi) \qquad (1)$$

Here, H(•) is a step function which returns 1 if the argument is non-negative and 0 if the argument is negative. That is, if the identification result is 1, the observation is determined to be anomalous, and if it is 0, it is determined to be normal. For the implementation of the function $A_{\theta_A}(x)$, a method using a deep autoencoder (AE) has been proposed. The deep autoencoder compresses the input $x_t$ into a low-dimensional vector using a neural network (encoding) and restores it to the input using the neural network again (decoding). In the anomalous sound detection using the deep autoencoder, the anomaly score is calculated by the expression (2) as the reconstruction error.

[Math. 2]

$$A_{\theta_A}(x)=\|x_t-AE_{\theta_A}(x_t)\|_2^2 \qquad (2)$$

In order to reduce the anomaly score with respect to the normal sound, the parameter $\theta_A$ is learned to reduce the average reconstruction error of the normal sound. The above method is used in, for example, Non-Patent Literature 1 and the like.

In the method of Non-Patent Literature 1, an anomalous sound can be overlooked. Therefore, Non-Patent Literature 2 proposes a registered anomalous sound detection technique in which an anomalous sound which has been overlooked is first registered (learned), and if the observed signal thereafter is similar to the registered anomalous sound, the observed signal is determined to be anomalous. In this method, several frames of registered sounds including user anomalous sounds are input to the system. The system estimates a matrix which compresses the registered sound into a low-dimensional vector. After that, the observation system also uses the same compression matrix to compress the observed signal into a low-dimensional vector, and when the two vectors are similar, the observed signal is determined to be an anomalous sound.

CITATION LIST

Non-Patent Literature

Non-Patent Literature 1: Y. Koizumi, S. Saito, H. Uematsu, Y. Kawachi, and N. Harada, "Unsupervised Detection of Anomalous Sound based on Deep Learning and the Neyman-Pearson Lemma," IEEE/ACM Transactions on Audio, Speech, and Language Processing, Vol. 27-1, pp. 212-224, 2019.

Non-Patent Literature 2: Y. Koizumi, S. Murata, N. Harada, S. Saito, and H. Uematsu, "SNIPER: Few-shot Learning for Anomaly Detection to Minimize False-Negative Rate with Ensured True-Positive Rate," in Proceedings of International Conference on Acoustics, Speech and Signal Processing (ICASSP 2019), 2019.

SUMMARY OF THE INVENTION

Technical Problem

However, in the method of Non-Patent Literature 2, the following two problems exist.

The first problem relates to cutting out the registered sound. In Non-Patent Literature 2, in order to register an anomalous sound, it is necessary to manually cut out a frame containing the anomalous sound and several frames before and after it. This number of frames is a predetermined fixed value. Therefore, (1) an anomalous sound with a duration longer than the specified number of frames cannot be detected, and (2) in order to register an anomalous sound, it is necessary that a user who has expertise in acoustic signal processing such as spectrogram display cuts out an anomalous sound over a certain time interval. Therefore, a technique is necessary for inputting the registered sound $Z=\{z_0 \in \mathbb{R}^F\}_{k=1}^K$ with an arbitrary time frame length K to automatically extract an appropriate feature amount $m \in R^D$ from the registered sound Z. Extracting the feature amount is also called embedding.

The second problem is a problem about registration of an erroneously detected normal sound. Non-Patent Literature 2 has dealt with "overlooking" (FN: False-Negative) in which an anomalous sound is erroneously determined to be normal. Another erroneous determination in anomalous sound detection is "erroneous detection" (FP: False-Positive) in which a normal sound is erroneously determined to be anomalous. Therefore, a technique for registering normal sounds is necessary not only to deal with overlooking but also to suppress erroneous detection.

An object of the present invention is to provide a technique capable of extracting an appropriate feature amount from a registered sound with an arbitrary length and suppressing erroneous determination in view of the technical problems as described above.

Means for Solving the Problem

In order to solve the above problems, a feature extraction apparatus according to a first aspect of the present invention is a feature extraction apparatus which extracts a feature amount with a fixed-length from a time-series acoustic signal with a variable arbitrary length, and comprises a feature extraction unit which extracts a feature amount from the time-series acoustic signal, and the feature extraction unit is optimized to extract, from the time-series acoustic signal including at least a known normal sound and an unknown normal sound, a feature amount which reflects a feature of the unknown normal sound, and to extract, from the time-series acoustic signal including at least an anomalous sound and a normal sound, a feature amount which reflects a feature of the anomalous sound.

In order to solve the above problems, an anomaly score estimation apparatus according to a second aspect of the present invention is an anomaly score estimation apparatus which estimates an anomaly score of a time-series acoustic signal, and comprises a division unit which divides the time-series acoustic signal by a predetermined length, a feature extraction unit which extracts a feature amount from the divided time-series acoustic signal using the feature extraction apparatus according to the first aspect, and an anomaly score calculation unit which calculates the anomaly score from the feature amount of the divided time-series acoustic signal.

Effects of the Invention

According to the present invention, an appropriate feature amount can be extracted from registered sounds with an arbitrary length, and erroneous determination can be suppressed.

DESCRIPTION OF EMBODIMENTS

Summary of the Invention

Figure 1:
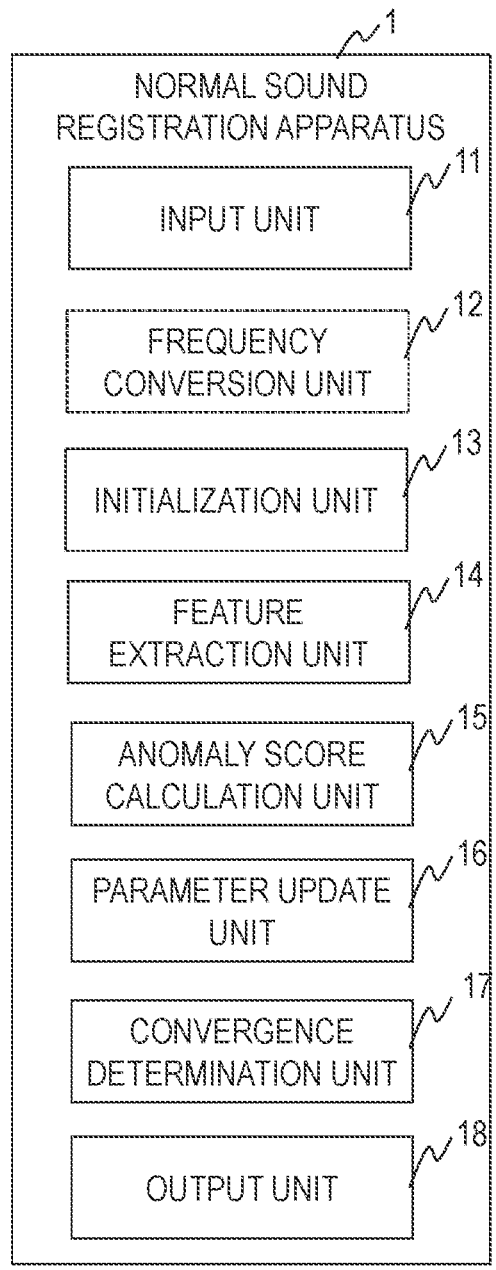
FIG. 1 is a diagram illustrating a functional configuration of a normal sound registration apparatus.

<Technique to Solve the First Problem: Feature Extraction of a Registered Sound>

First, a technique for embedding a registered sound $Z=\{z_k \in R^F\}_{k=1}^K$ with an arbitrary time frame length is described. In this technique, embedding is realized by combining the main points of two techniques, (1) time-frequency masking and (2) self-attention. Time-frequency masking is a general approach used for speech enhancement and the like (see Reference Literature 1 for example). Self-attention is a general approach widely used for document search and the like (see Reference Literature 2 for example). By adopting a new approach which combines the main points of the two techniques, for embedding to detect registered sounds, it is possible to extract the features of the sounds which are desirable to be detected even under noise such as in a factory, and also to embed registered sounds with the same algorithm regardless of the length of the duration, which is a resulting synergistic effect suitable for registered sound normality/anomaly detection, specific sound event detection (or rare sound event detection), and the like.

[Reference Literature 1] Y. Koizumi, K. Niwa, Y. Hioka, K. Kobayashi, and Y. Haneda, "DNN-based Source Enhancement to Increase Objective Sound Quality Assessment Score," IEEE/ACM Transactions on Audio, Speech, and Language Processing, Vol. 26-10, pp. 1780-1792, 2018.

[Reference Literature 2] A. Vaswani, N. Shazeer, N. Parmar, J. Uszkoreit, L. J ones, A. N. Gomez, L. Kaiser, and I. Polosukhin, "Attention Is All You Need," in Proceedings of 31st Conference on Neural Information Processing Systems (NIPS 2017), 2017.

<<Point 1: Estimating the Mask Matrix>>

For signals observed at factories or the like, not only the operating sound of observation equipment but also ambient noise or the like is observed at the same time. This causes a decrease in accuracy because noise is also embedded at the same time when the registered sound Z is embedded. Therefore, first, unnecessary information is removed from the registered sound Z with reference to the time-frequency masking.

[Math. 3]

$$Z'=G \circ Z=\{z'_k \in R^F\}_{k=1}^K \quad (3)$$

$$G=M_{\theta_M}(Z)=\{g_k \in R_{[0,1]}^F\}_{k=1}^K \quad (4)$$

Here, $\circ$ represents multiplication for each element. $M_{\theta_M}$: $R^{F \times K} \to R_{[0,1]}^{F \times K}$ is some function with a parameter $\theta_M$, and can be implemented in a deep neural network (DNN) or the like for example. Limiting the output of $M_{\theta_M}$ to [0, 1] is intended to keep the necessary information unchanged and to make the unnecessary information zero. When implementing $M_{\theta_M}$ in a deep neural network, the activation function of the output layer may be the sigmoid function. If $x_t$ is not a complex spectrum, G is not a time-frequency mask in the sense of speech enhancement, so G is simply referred to as a mask matrix hereafter.

<<Point 2: Weighted Sum of Time Frames which are Easy to be Erroneously Determined>>

Then, an approach of embedding Z' obtained by the expression (3) in the low-dimensional vector $m \in R^D$ is described. Here, the time frame which is easy to be erroneously determined is a time frame including for example an unknown normal sound when the input registered sound is a normal sound, and is a time frame including an anomalous sound when the input registered sound is an anomalous sound. First, using self-attention, the time series data Z' is aggregated into one vector $y' \in R^C$. Then using the compression matrix $W_s \in R^{C \times F}$, y' is embedded in m. This procedure can be described as follows.

[Math. 4]

$$m = W_s y' \tag{5}$$

$$y' = \sum_{k=1}^{K} p_k y_k \tag{6}$$

$$Y = P_{\theta_P}(Z') = \{y_k \in R^C\}_{k=1}^{K} \tag{7}$$

$$p = \text{softmax}(W_p Y) = \{p_k \in R_{[0,1]}\}_{k=1}^{K} \tag{8}$$

Here, $P_{\theta_P}: R^{F \times K} \to R^{C \times K}$ is a function with a parameter $\theta_P$, implemented in a deep neural network or the like. Also, $W_P \in R^{1 \times c}$. Self-attention is an approach used for newly input documents in fields such as document search, but in the present invention, it is used only for embedding the input registered sound Z in advance, and is not used when determining the anomaly of the newly obtained observed signal X. As such, although learning takes time, high-speed determination can be realized because the anomaly determination of the observed signal X does not require complicated calculation for the registered sound.

From the above, the parameters of the embedding method are $\theta_E = \{\theta_M, \theta_P, W_p, W_s\}$. The learning method should be changed depending on the method used after embedding Z, and if it is used for registered anomalous sound detection, the learning method or the cost function proposed in Non-Patent Literature 2 should be used. If it is used for registered normal sound detection, learning may be performed with the method described later.

<Technique to Solve the Second Problem: Similarity Score Index for Registering Normal Sounds and its Learning Method>

Now, assume that N−1 normal sounds are registered in the model, and the N-th erroneously detected normal sound $Z_N$ is desired to be registered so as not to be erroneously detected. The subscript n used in the expression (9) indicates that it is a parameter corresponding to the n-th registered normal sound. Hereinafter, even if it is used in a mathematical expression, its description is omitted. In addition, the description may be omitted in the text. Since the anomaly score with respect to the registered normal sound is desired to be reduced, an anomaly score function is newly defined as in expression (9).

[Math. 5]

$$B(x_t, \theta) = A(x_t, \theta_A) - \sum_{n=1}^{N} S(x_t, m_n, \theta_{S,n}) \tag{9}$$

Here, $\theta = \{\theta_A, \{\theta_{S,n}\}_{n=1}^{N}\}$, and $m_n$ is a vector in which the registered normal sound $Z_n$ is embedded. $S: R^F \to R_{>0}$ is a function with a parameter $\theta_{S,n}$, and returns a large value if $x_t$ and $m_n$ are similar. Though embedding method for Z is not particularly limited, for example the above-described embedding method can be used.

For $B(x_t, \theta)$, if $x_t$ and $m_n$ are similar, the value may be less than or equal to the threshold value $\varphi$. Now, assume that $\rho(<\varphi)$ is the value which $B(x_t, \theta)$ should take when $x_t$ and $m_n$ are the same sound. If $x_t$ is a normal sound, then $B(x_t, \theta) = A(x_t, \theta_A)$ should be satisfied when $A(x_t, \theta_A) < \rho$. As a similarity score function which satisfies the above condition, the following is used in the present invention.

[Math. 6]

$$S(x_t, m_n, \theta_{S,n}) = S_{t,n}(A(x_t, \theta) - \min(A(x_t, \theta), \rho)) \tag{10}$$

$$S_{t,n} = \frac{1}{2}\left(\frac{f_{t,n}^T m_n}{\|f_{t,n}\|\|m_n\|} + 1\right) \tag{11}$$

Here, $S_{t,n} \in R_{[0,1]}$ is a function representing the similarity score between $f_{t,n}$ and $m_n$, and is calculated based on the cosine similarity score in the present invention. Further, $f_{t,n} \in R^D$ is a vector in which $x_t$ is embedded, and for example, referring to Non-Patent Literature 2, it may be implemented with $v_x \in R^F$ and $W_x \in R^{D \times F}$ as in expression (12).

[Math. 7]

$$f_{t,n} = W_{x,n}(x_t \circ \text{sigmoid}(v_{x,n})) \tag{12}$$

From the above, the parameter for registered normal sound detection is $\theta_s = \{W_x, v_x\}$. Further, if a parameter is necessary for the calculation of m as in the above-described embedding method, it is also included in $\theta_s$. These parameters should be learned so that $B(x_t, \theta)$ becomes smaller when $A(x_t, \theta_A)$ exceeds the threshold (p. In the present invention, the following is used as a cost function for learning the parameter $\theta_{S,N}$ for the N-th registered normal sound, which realizes this.

[Math. 8]

$$L_{\theta_{S,N}} = \frac{1}{\sum_{t=1}^{T} d_t} \sum_{t=1}^{T} d_t B(x_t, \theta) \tag{13}$$

$$d_t = \text{sigmoid}(A(x_t, \theta_A) - \phi) \tag{14}$$

Here, $L_{\theta_{S,N}}$ can be differentiated by $\theta_{S,N}$ if $L_{\theta_{S,N}}$ can be differentiated by the parameter for embedding m, therefore $\theta_{S,N}$ can be learned by using the gradient method or the like. If the anomalous sound data $U = \{u_\tau \in R^F\}_{\tau=1}^{T_u}$ is also obtained or can be simulated, $B(x_t, \theta)$ should not reduce the anomaly score for U. Therefore, the cost function may be changed as follows.

[Math. 9]

$$L'_{\theta_{S,N}} = L_{\theta_{S,N}} - \frac{1}{T_u} \sum_{\tau=1}^{T_u} B(u_\tau, \theta) \tag{15}$$

Embodiment

Hereinafter, an embodiment of the present invention is described in detail. In the drawings, the components having the same function are given the same number, and duplicate description is omitted.

The embodiment of the present invention includes a normal sound registration apparatus 1 which learns the parameters for detecting the registered normal sound described above, and a registered normal sound detection apparatus 2 which determines whether an observed signal is normal or anomalous while determining whether or not the observed signal is the registered normal sound using the parameters learned by the normal sound registration apparatus 1.

<<Normal Sound Registration Apparatus>>

As illustrated in FIG. 1, the normal sound registration apparatus 1 of the embodiment includes an input unit 11, an initialization unit 13, a feature extraction unit 14, an anomaly score calculation unit 15, a parameter update unit 16, a convergence determination unit 17, and an output unit 18. The normal sound registration apparatus 1 may further include a frequency conversion unit 12 if necessary. The normal sound registration method of the embodiment is realized by this normal sound registration apparatus 1 performing the processing of each step illustrated in FIG. 2.

The normal sound registration apparatus 1 is a special apparatus configured by loading a special program into a known or dedicated computer having, for example, a central processing unit (CPU), a main storage apparatus (RAM: Random Access Memory), and the like. The normal sound registration apparatus 1 executes each processing under the control of the central processing unit, for example. The data input to the normal sound registration apparatus 1 and the data obtained by each processing are, for example, stored in the main storage apparatus, and the data stored in the main storage apparatus is read out to the central processing unit as necessary and used for other processing. At least a part of each processing unit of the normal sound registration apparatus 1 may be configured by hardware such as an integrated circuit.

Figure 2:
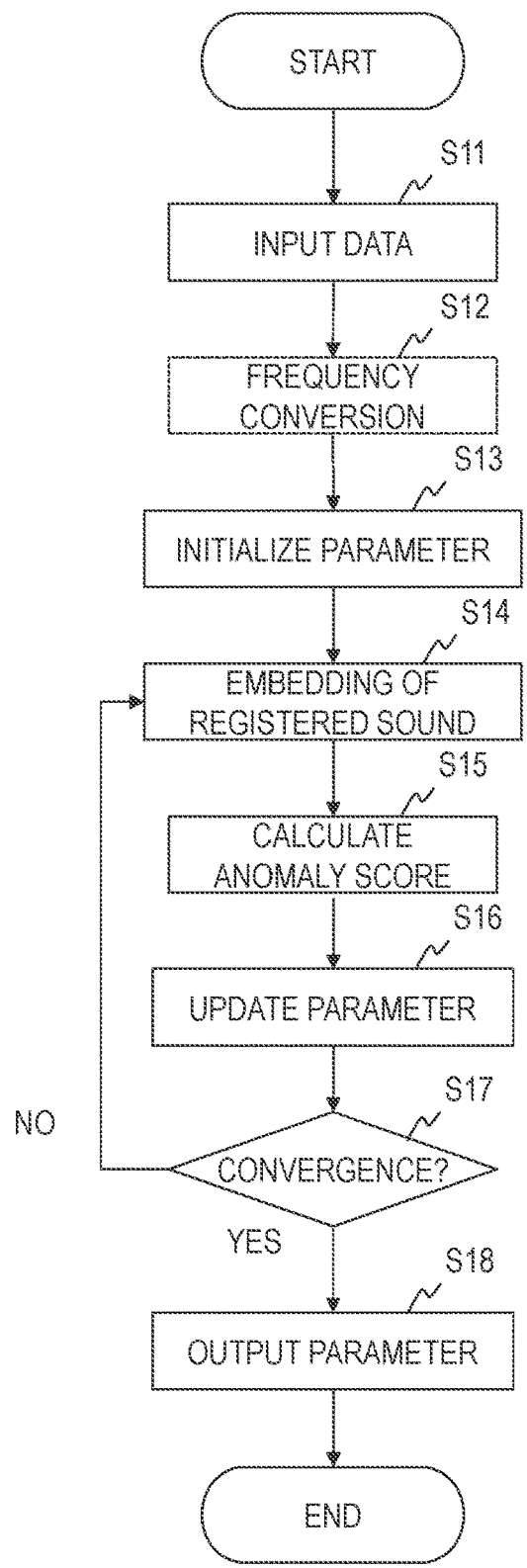
FIG. 2 is a diagram illustrating a processing procedure of a normal sound registration method.

Hereinafter, a normal sound registration method executed by the normal sound registration apparatus 1 of the embodiment is described with reference to FIG. 2.

In step S11, the input unit 11 receives as inputs a registered sound $Z=\{z_k \in R^F\}_{k=1}^{K}$ with an arbitrary frame length, a conventional function $A(x_t, \theta_A)$ for calculating the anomaly score, and normal data and anomalous data used when learning the function $A(x_t, \theta_A)$. However, the anomalous data does not have to exist. The registered sound Z is a normal sound (for example, an erroneously detected normal sound) desired to be registered when the purpose is to detect a registered normal sound, and is an anomalous sound (for example, an overlooked anomalous sound) desired to be registered when the purpose is to detect a registered anomalous sound. In addition, necessary parameters such as the number of dimensions for embedding (for example, C and D described above) are also input as appropriate. The number of dimensions may be set to, for example, about D=4 and C=30. For $x_t$ and $z_k$, as described in Non-Patent Literature 1 for example, the mel filter bank output or the like may be used. If the registered sound Z is an acoustic signal in the time domain, the frequency conversion unit 12 is further provided, and in step S12, the frequency conversion unit 12 may convert the registered sound Z into an acoustic signal in the frequency domain. The input unit 11 (or the frequency conversion unit 12) outputs the received registered sound Z to the feature extraction unit 14.

In step S13, the initialization unit 13 initializes the parameter $\theta_{S,N}$ with random numbers or the like. When the purpose is to detect a registered anomalous sound, the parameter $\theta_E$ and the parameters described in Non-Patent Literature 2 are initialized.

In step S14, the feature extraction unit 14 receives the registered sound Z from the input unit 11 (or the frequency conversion unit 12), and calculates expressions (3) to (8) to embed the features of the registered sound Z in a D-dimensional vector m. The feature extraction unit 14 outputs the vector m in which the registered sound Z is embedded to the anomaly score calculation unit 15.

In step S15, the anomaly score calculation unit 15 receives the vector m from the feature extraction unit 14, and calculates the expression (9) to acquire the anomaly score $B(x_t, \theta)$. When the purpose is to detect a registered anomalous sound, the calculation of the anomaly score described in Non-Patent Literature 2 may be performed. The anomaly score calculation unit 15 outputs the acquired anomaly score $B(x_t, \theta)$ to the parameter update unit 16.

In step S16, the parameter update unit 16 receives the anomaly score $B(x_t, \theta)$ from the anomaly score calculation unit 15, and update the parameter $\theta_{S,N}$ to decrease the cost function $L_{\theta_{S,N}}$ of the expression (13) or the cost function $L'_{\theta_{S,N}}$ of the expression (15). When the purpose is to detect a registered anomalous sound, the cost function described in Non-Patent Literature 2 may be used.

In step S17, the convergence determination unit 17 determines whether or not the preset end condition is satisfied. The convergence determination unit 17 proceeds with the processing to step S18 if the end condition is satisfied, and returns the processing to step S14 if not. The end condition may be set to be, for example, that the parameter update has been executed a predetermined number of times or the like.

In step S18, the output unit 18 outputs the learned parameter $\theta_{S,N}$. When the purpose is to detect a registered anomalous sound, the learned parameter $\theta_E$ and the parameters described in Non-Patent Literature 2 are output.

<<Registered Normal Sound Detection Apparatus>>

Figure 3:
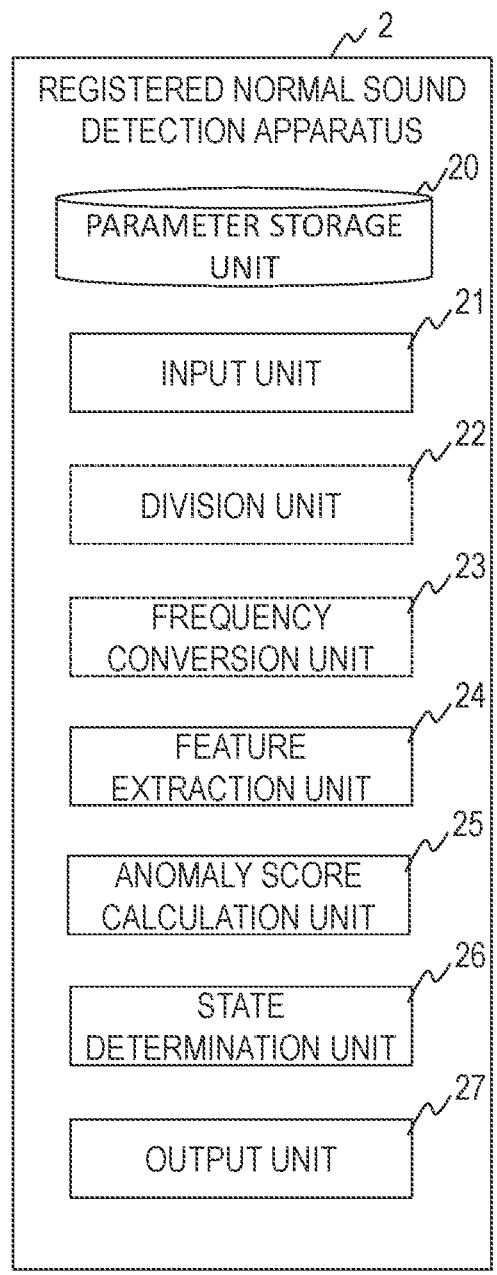
FIG. 3 is a diagram illustrating a functional configuration of a registered normal sound detection apparatus.

As illustrated in FIG. 3, the registered normal sound detection apparatus 2 of the embodiment includes a parameter storage unit 20, an input unit 21, a feature extraction unit 24, an anomaly score calculation unit 25, a state determination unit 26, and an output unit 27. The registered normal sound detection apparatus 2 may further include a division unit 22 and a frequency conversion unit 23 if necessary. The registered normal sound detection method of the embodiment is realized by this registered normal sound detection apparatus 2 performing the processing of each step illustrated in FIG. 4.

The registered normal sound detection apparatus 2 is a special apparatus configured by loading a special program into a known or dedicated computer having, for example, a central processing unit (CPU), a main storage apparatus (RAM: Random Access Memory), and the like. The registered normal sound detection apparatus 2 executes each processing under the control of the central processing unit, for example. The data input to the registered normal sound detection apparatus 2 and the data obtained by each processing are, for example, stored in the main storage apparatus, and the data stored in the main storage apparatus is read out to the central processing unit as necessary and used for other processing. At least a part of each processing unit of the registered normal sound detection apparatus 2 may be configured by hardware such as an integrated circuit. Each storage unit included in the registered normal sound detection apparatus 2 can be configured with, for example, a main storage apparatus such as RAM (Random Access Memory), an auxiliary storage apparatus composed of a hard disk, an optical disk or a semiconductor memory element like a flash memory, or middleware such as relational databases and key-value stores.

The parameter storage unit 20 stores the learned parameter $\theta = \{\theta_A, \{\theta_{S,n}\}_{n=1}^N\}$ and the threshold value $\varphi$. The parameter $\theta_A$ is a conventional parameter for calculating the anomaly score, and the parameter $\theta_{S,n}$ is a parameter learned by the normal sound registration apparatus 1. The threshold value $\varphi$ may be a threshold value determined in the process of learning the conventional parameters for calculating the anomaly score, or may be a threshold value manually given in advance.

Figure 4:
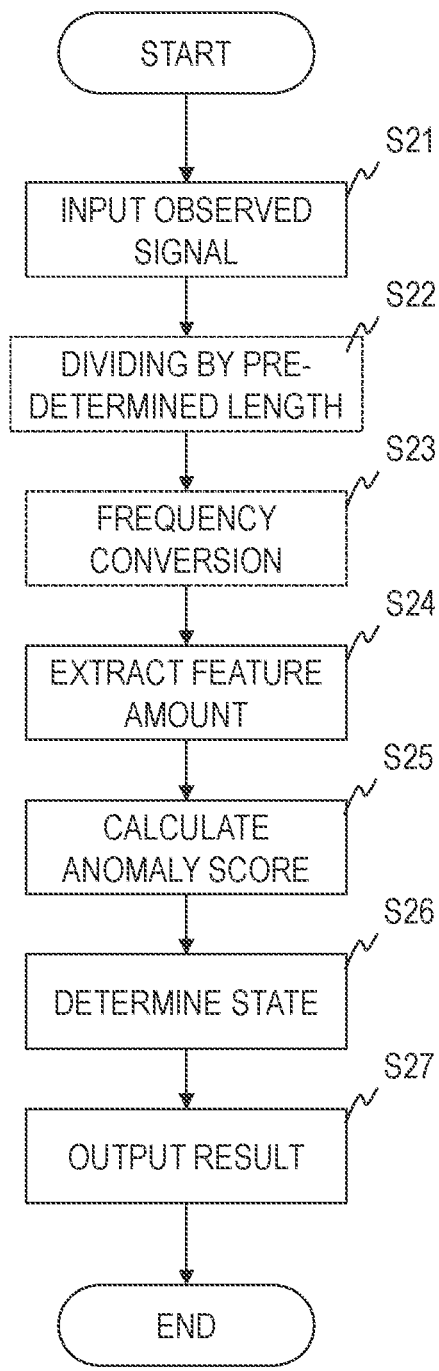
FIG. 4 is a diagram illustrating a processing procedure of a registered normal sound detection method.

Hereinafter, a registered normal sound detection method executed by the registered normal sound detection apparatus 2 of the embodiment is described with reference to FIG. 4.

In step S21, the input unit 21 receives as an input the observed signal x to be the target of the registered normal sound detection. In the case where the observed signal x is sequentially input in real time, such as when the target of anomalous sound detection is constantly monitored, or similar cases, the division unit 22 is further provided, and in step S22, the division unit 22 may divide the observed signal x by a predetermined length. If the observed signal x is an acoustic signal in the time domain, the frequency conversion unit 23 is further provided, and in step S23, the frequency conversion unit 23 may convert the observed signal x into an acoustic signal in the frequency domain. The input unit 21 (or the division unit 22 or the frequency conversion unit 23) outputs the observed signal x to the feature extraction unit 24.

In step S24, the feature extraction unit 24 receives the observed signal x from the input unit 21 (or the division unit 22 or the frequency conversion unit 23), and calculates expressions (3) to (8) to embed the features of the observed signal x in a D-dimensional vector m. The feature extraction unit 24 outputs the vector m in which the observed signal x is embedded to the anomaly score calculation unit 25.

In step S25, the anomaly score calculation unit 25 receives the vector m from the feature extraction unit 24, and calculates the expression (9) to acquire the anomaly score $B(x, \theta)$. The anomaly score calculation unit 25 outputs the acquired anomaly score $B(x, \theta)$ to the state determination unit 26.

In step S26, the state determination unit 26 receives the anomaly score $B(x, \theta)$ from the anomaly score calculation unit 25, and calculates the expression (1) to determine whether the observed signal x is normal or anomalous. The state determination unit 26 outputs a determination result, which is binary data indicating whether the observed signal x is normal or anomalous, to the output unit 27.

In step S27, the output unit 27 receives the determination result from the state determination unit 26, and outputs the determination result as the output of the registered normal sound detection apparatus 2.

[Experimental Results]

Figure 5:
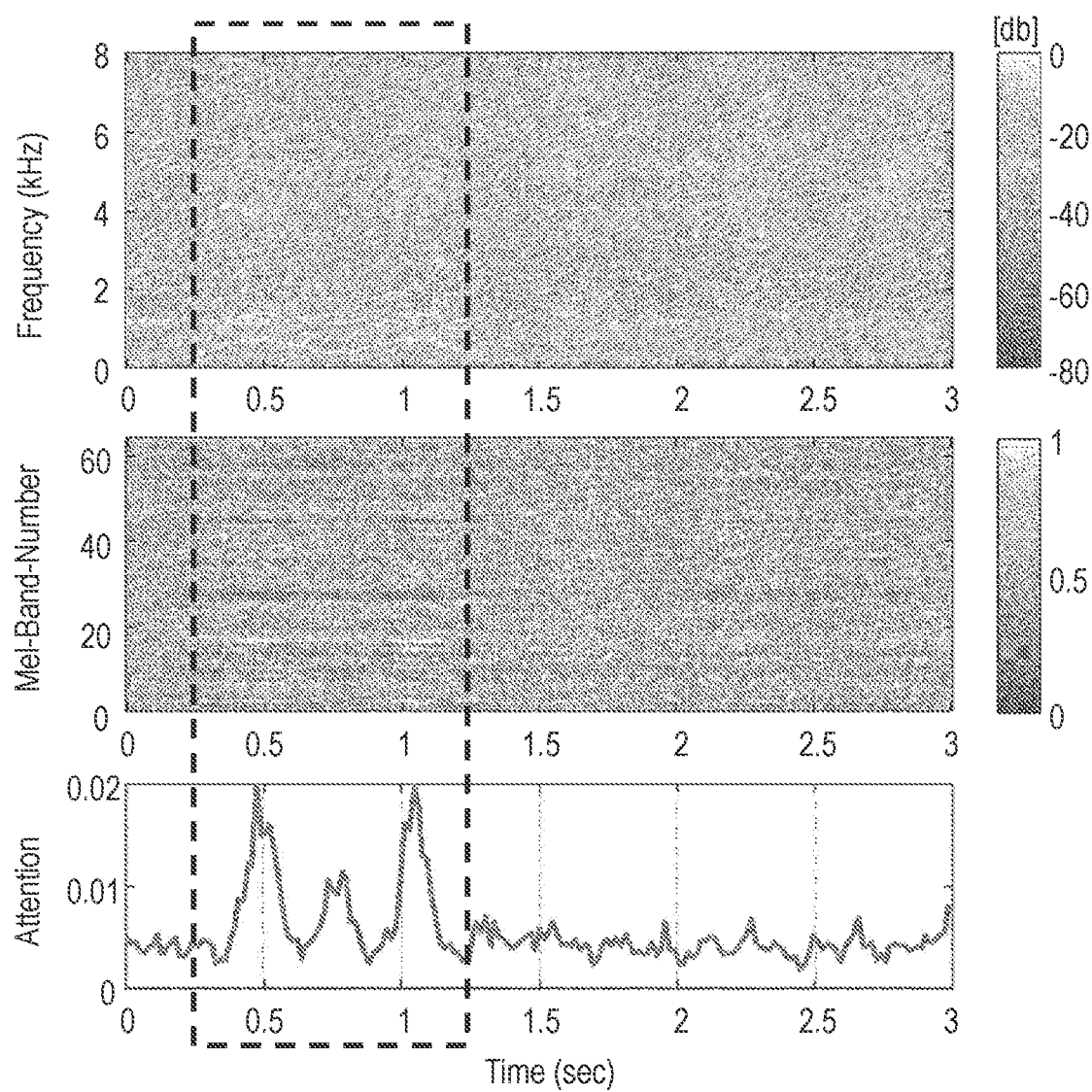
FIG. 5 is a diagram illustrating an experimental result.
Figure 6:
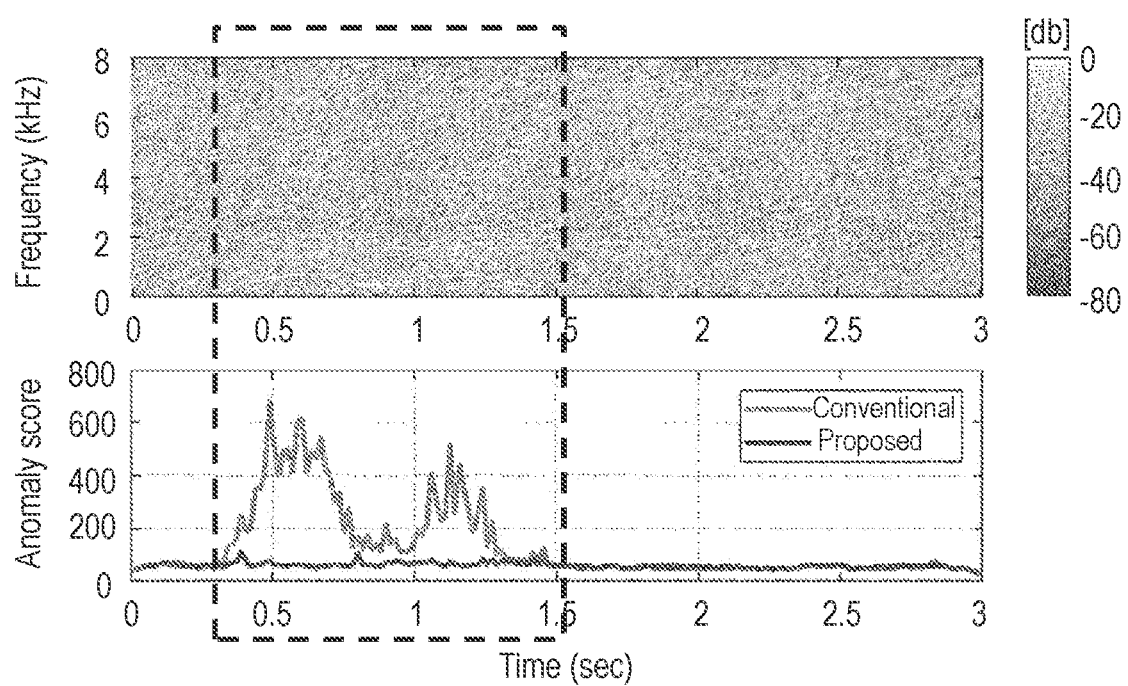
FIG. 6 is a diagram illustrating an experimental result.

The experimental results of detecting the registered normal sound using the registered normal sound detection apparatus of the embodiment are shown in FIGS. 5 and 6. The upper part of FIG. 5 is a spectrogram of the registered normal sound. This sound includes a siren sound from about 0.25 seconds to about 1.25 seconds surrounded by a broken line. If this sound is not included in the learning data when designing the anomaly score A, this sound will be erroneously detected. Therefore, this normal sound was registered using the normal sound registration apparatus of the embodiment. As a result, the mask matrix as shown in the middle part of FIG. 5 and the self-attention coefficient as shown in the lower part of FIG. 5 were estimated. For the mask matrix in the middle part of FIG. 5, relatively large values are output in the time interval in which the siren sound exists. Also for the self-attention coefficient in the lower part of FIG. 5, relatively large values are output in the time interval in which the siren sound exists.

FIG. 6 shows the anomaly score calculation result of the test sound (normal sound) different from the sound used for learning. The upper part of FIG. 6 is a spectrogram of the test sound. This sound includes a siren sound similar to the registered normal sound in the upper part of FIG. 5 from about 0.4 seconds to about 1.4 seconds surrounded by a broken line. The lower part of FIG. 6 shows the anomaly score $A(x_t, \theta_A)$ output by the prior art (Conventional) and the anomaly score $B(x_t, \theta)$ output by the present invention (Proposed). As shown in the lower part of FIG. 6, in the prior art, the siren sound is determined to be an anomalous sound and the anomaly score increases, but in the present invention, the anomaly score does not increase even in the time interval in which the siren sound is present. From these experimental results, it can be seen that an appropriate anomaly score can be calculated by the present invention and erroneous detection is suppressed.

[Variation]

In the above-described embodiment, the normal sound registration apparatus 1 is configured to extract the feature amount from the normal sound desired to be registered and learn the parameters for detecting the registered normal sound, but it is also possible to configure a feature extraction apparatus including only the function of extracting the feature amount from the registered sound. This feature extraction apparatus includes the feature extraction unit 14 included in the normal sound registration apparatus 1 of the embodiment. This feature extraction apparatus may further include the frequency conversion unit 12. This feature extraction apparatus, for example, takes a time-series acoustic signal with an arbitrary length as an input, and outputs a feature amount with a fixed length reflecting the features of the registered sound.

In the above-described embodiment, the registered normal sound detection apparatus 2 is configured to calculate the anomaly score from the observed signal and use the anomaly score to determine whether it is normal or anomalous, but it is also possible to configure an anomaly score estimation apparatus including only the function of calculating the anomaly score from the observed signal. This anomaly score estimation apparatus includes the parameter storage unit 20, the feature extraction unit 24, and the anomaly score calculation unit 25 included in the registered normal sound detection apparatus 2 of the embodiment. This anomaly score estimation apparatus may further include the division unit 22 and the frequency conversion unit 23. This anomaly score estimation apparatus, for example, takes an observed signal as an input, estimates the anomaly score of the observed signal using the feature amount extracted from the observed signal using the learned parameters, and outputs the anomaly score.

In the above-described embodiment, the configuration in which the function of extracting the feature amount is used to learn the parameter for detecting the registered sound has been described, but this function is not only applied to this, but also can be applied to any technique which requires an appropriate feature amount reflecting the features of data with an arbitrary length. Further, in the above-described embodiment, the configuration in which the function of calculating the anomaly score from the observed signal is used to determine whether the target apparatus is in a normal state or an anomalous state has been described, but this function is not only applied to this, but also can be applied to any technique for determining the state from the obtained sample.

In the above-described embodiment, an example in which the normal sound registration apparatus 1 and the registered normal sound detection apparatus 2 are configured as separate apparatus has been described, but it is also possible to configure one registered normal sound detection apparatus including both a function of learning parameters for detecting registered sounds and a function of detecting registered sounds using learned parameters. That is, this registered normal sound detection apparatus includes the input unit 11, the initialization unit 13, the feature extraction unit 14, the anomaly score calculation unit 15, the parameter update unit 16, the convergence determination unit 17, the parameter storage unit 20, the input unit 21, the state determination unit 26 and the output unit 27. This registered normal sound detection apparatus may further include the frequency conversion unit 12 and the division unit 22.

In the above-described embodiment, the registered normal sound detection for sound data has been described, but the present invention can also be applied to other than sound data. For example, the present invention can also be applied to time series data other than sound data, and image data. In order to be applied to this, x may be selected to be suitable for the application target. If it is a vibration sensor or stock price data, it may be a collection of these time-series information or the result of Fourier transforming it, and if it is an image, it may be an image feature amount or the result of analyzing it with a neural network or the like. In this case, the registered normal sound detection apparatus 2 functions as an anomaly detection apparatus which determines whether the observed data is normal or anomalous by using the anomaly score in which the normal data, which is the data at the normal time, is registered.

Although the embodiments of the present invention have been described above, the specific configuration is not limited to these embodiments, and even if the design or the like is appropriately changed without departing from the spirit of the present invention, it goes without saying that such changes are included in this invention. The various processes described in the embodiments are not only executed in chronological order according to the order described, but also may be executed in parallel or individually depending on the processing capacity or necessity of the apparatus which executes the processes.

[Program, Recording Medium]

Figure 7:
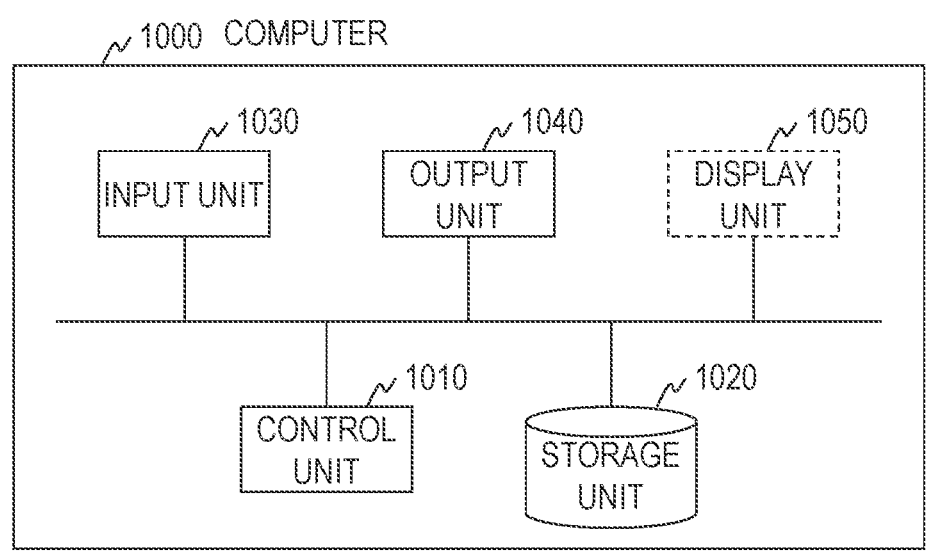
FIG. 7 is a diagram illustrating a functional configuration of a computer.

When various processing functions in each apparatus described in the above embodiments are realized by a computer, the processing contents of the functions which each apparatus should have are described by a program. Then, by loading this program into the storage unit 1020 of the computer shown in FIG. 7 and operating the control unit 1010, the input unit 1030, the output unit 1040, and the like, various processing functions in each of the above apparatus are realized on the computer.

A program describing this processing contents can be recorded on a computer-readable recording medium. The computer-readable recording medium may be any medium such as, for example, a magnetic recording apparatus, an optical disk, a magneto-optical recording medium, a semiconductor memory.

Distribution of this program is performed, for example, by selling, giving, lending, or the like, a portable recording medium such as a DVD or CD-ROM on which the program is recorded. Further, a configuration may be made where this program has been stored in a storage apparatus of a server computer, and this program is distributed by transferring the program from the server computer to another computer via a network.

A computer which executes such a program, for example, first temporarily stores in its own storage apparatus the program recorded on the portable recording medium or the program transferred from the server computer. Then, when the process is executed, this computer reads the program stored in its own storage apparatus and executes the process according to the read program. Moreover, as another execution form of this program, the computer may read the program directly from the portable recording medium and execute the process according to the program, and further, each time the program is transferred from the server computer to this computer, the process according to the received program may be executed sequentially. In addition, a configuration may be made where the above-described process is executed by a so-called ASP (Application Service Provider) type service which realizes the processing function only by the execution instruction and result acquisition without transferring the program from the server computer to this computer. The program in this form includes information which is provided for processing by a computer and which is equivalent to a program (data which is not a direct command to the computer but has a property of defining the processing of the computer, and the like).

In this form, the present apparatus is configured by executing a predetermined program on the computer, but at least a part of these processing contents may be realized by hardware.

The invention claimed is:

1. A feature extraction apparatus which extracts a feature amount with a fixed-length from a time-series acoustic signal with a variable arbitrary length, the feature extraction apparatus comprising:
processing circuitry configured to
execute a feature extraction processing which extracts a feature amount from the time-series acoustic signal,
wherein the feature extraction processing is optimized to extract, from the time-series acoustic signal including at least a known normal sound and an unknown normal sound, a feature amount which reflects a feature of the unknown normal sound, and to extract, from the time-series acoustic signal including at least an anomalous sound and a normal sound, a feature amount which reflects a feature of the anomalous sound.

2. The feature extraction apparatus according to claim 1, the processing circuitry further configured to:
execute a frequency conversion processing which acquires a time-series frequency signal obtained by frequency-converting the time-series acoustic signal,
wherein the feature extraction processing estimates the feature of the known normal sound or the anomalous sound having a low frequency of occurrence based on a component in a time domain of the time-series acoustic signal and a component in a frequency domain of the time-series frequency signal, and extracts the feature amount.

3. The feature extraction apparatus according to claim 2, wherein the feature extraction processing extracts the feature amount by weighting the feature estimated from the time-series acoustic signal for each time interval.

4. A non-transitory computer-readable recording medium on which a feature extraction program for causing a computer to operate as the feature extraction apparatus according to claim 3.

5. An anomaly score estimation apparatus which estimates an anomaly score of a time-series acoustic signal, the apparatus comprising
processing circuitry configured to:
execute a division processing which divides the time-series acoustic signal by a predetermined length,
execute a feature extraction processing which extracts a feature amount from the divided time-series acoustic signal using the feature extraction apparatus according to claim 3, and
execute an anomaly score calculation processing which calculates the anomaly score from the feature amount of the divided time-series acoustic signal.

6. A non-transitory computer-readable recording medium on which a feature extraction program for causing a computer to operate as the feature extraction apparatus according to claim 2.

7. An anomaly score estimation apparatus which estimates an anomaly score of a time-series acoustic signal, the apparatus comprising
processing circuitry configured to:
execute a division processing which divides the time-series acoustic signal by a predetermined length,
execute a feature extraction processing which extracts a feature amount from the divided time-series acoustic signal using the feature extraction apparatus according to claim 2, and
execute an anomaly score calculation processing which calculates the anomaly score from the feature amount of the divided time-series acoustic signal.

8. An anomaly score estimation apparatus which estimates an anomaly score of a time-series acoustic signal, the anomaly score estimation apparatus comprising
processing circuitry configured to:
execute a division processing which divides the time-series acoustic signal by a predetermined length,
execute a feature extraction processing which extracts a feature amount from the divided time-series acoustic signal using the feature extraction apparatus according to of claim 1, and
execute an anomaly score calculation processing which calculates the anomaly score from the feature amount of the divided time-series acoustic signal.

9. A non-transitory computer-readable recording medium on which a anomaly score estimation program for causing a computer to operate as the anomaly score estimation apparatus according to claim 8.

10. A non-transitory computer-readable recording medium on which a feature extraction program for causing a computer to operate as the feature extraction apparatus according to claim 1.

11. A feature extraction apparatus which extracts a feature amount with a fixed-length from an input data with a variable arbitrary length, the apparatus comprising
processing circuitry configured to
execute a feature extraction processing which extracts a feature amount from the input data,
wherein the feature extraction processing is optimized to extract, from the input data including at least a known normal data and an unknown normal data, a feature amount which reflects a feature of the unknown normal data, and to extract, from the input data including at least an anomalous data and a normal data, a feature amount which reflects a feature of the anomalous data.

12. A non-transitory computer-readable recording medium on which a feature extraction program for causing a computer to operate as the feature extraction apparatus according to claim 11.

13. A feature extraction method for extracting a feature amount with a fixed-length from a time-series acoustic signal with a variable arbitrary length, the feature extraction method executing
a feature extraction step of extracting a feature amount from the time-series acoustic signal,
wherein the feature extraction step is optimized to extract, from the time-series acoustic signal including at least a known normal sound and an unknown normal sound, a feature amount which reflects a feature of the unknown normal sound, and to extract, from the time-series acoustic signal including at least an anomalous sound and a normal sound, a feature amount which reflects a feature of the anomalous sound.

14. An anomaly score estimation method for estimating an anomaly score of a time-series acoustic signal, the anomaly score estimation method executing:
a division step of dividing the time-series acoustic signal by a predetermined length,
a feature extraction step of extracting a feature amount from the divided time-series acoustic signal using the feature extraction method according to claim 13, and
an anomaly score calculation step of calculating the anomaly score from the feature amount of the divided time-series acoustic signal.

* * * * *

UNITED STATES PATENT AND TRADEMARK OFFICE
CERTIFICATE OF CORRECTION

| | |
|---|---|
| PATENT NO. | : 11,971,332 B2 |
| APPLICATION NO. | : 17/630141 |
| DATED | : April 30, 2024 |
| INVENTOR(S) | : Yuma Koizumi et al. |

It is certified that error appears in the above-identified patent and that said Letters Patent is hereby corrected as shown below:

In the Claims

In Column 13, Line 49 of Claim 8, the text reading:
-to of claim 1, and-
Should read:
--to claim 1, and--

Signed and Sealed this
First Day of October, 2024

Katherine Kelly Vidal
*Director of the United States Patent and Trademark Office*